United States Patent [19]
Moon

[11] Patent Number: 5,812,117
[45] Date of Patent: Sep. 22, 1998

[54] METHOD FOR INPUTTING INFORMATION USING A SELECTABLE SOFT KEYBOARD

[75] Inventor: Byoung-seoup Moon, Suwon, Rep. of Korea

[73] Assignee: Samsung Electronics Co., Ltd., Kyungki-do, Rep. of Korea

[21] Appl. No.: 802,944

[22] Filed: Feb. 21, 1997

Related U.S. Application Data

[63] Continuation of Ser. No. 470,231, Jun. 6, 1995, abandoned.

[30]    Foreign Application Priority Data

Dec. 29, 1994  [KR]  Rep. of Korea ................. 1994-39003

[51] Int. Cl.$^6$ .............................. G09G 5/34; G09G 5/08; G09G 5/00
[52] U.S. Cl. .......................... 345/169; 345/123; 345/124; 345/125; 345/146; 345/168; 345/171
[58] Field of Search ............................. 345/56, 123, 124, 345/125, 146, 156, 159, 160, 168, 169, 171, 172, 173; 364/419.01, 419.02, 419.03, 419.16

[56]               References Cited

U.S. PATENT DOCUMENTS

| | | | |
|---|---|---|---|
| 4,544,276 | 10/1985 | Horodeck | 341/28 |
| 4,660,032 | 4/1987 | Tsunoda | 345/123 |
| 4,862,390 | 8/1989 | Weiner | 345/146 |
| 4,908,612 | 3/1990 | Bromley et al. | 345/159 |
| 4,970,502 | 11/1990 | Kunikane et al. | 345/56 |
| 5,121,113 | 6/1992 | Kedge et al. | 345/168 |
| 5,128,672 | 7/1992 | Kaehler | 341/23 |
| 5,157,737 | 10/1992 | Sklaren | 345/173 |
| 5,162,783 | 11/1992 | Moreno . | |
| 5,475,835 | 12/1995 | Hickey | 345/173 |
| 5,477,241 | 12/1995 | Higgins et al. | 345/902 |
| 5,485,197 | 1/1996 | Hoarty | 345/902 |
| 5,510,808 | 4/1996 | Cina, Jr. et al. | 345/123 |

*Primary Examiner*—Steven J. Saras
*Assistant Examiner*—Vijay Shankar
*Attorney, Agent, or Firm*—Leydig, Voit & Mayer, Ltd.

[57]                ABSTRACT

A portable information terminal adopting a soft keyboard includes screen display device for receiving screen data relating to the soft keyboard and displaying the soft keyboard on the display screen. The soft keyboard includes an information key region where the information keys of a predetermined number are arranged in two lines or less, and a scroll key region where one or more scroll direction keys are displayed for scrolling the information keys to select the information keys displayed on the information key region. A method for inputting information using the soft keyboard includes the steps of displaying the soft keyboard on a display screen wherein the soft keyboard includes an information key region where the information keys of a predetermined number are arranged in two lines or less, and a scroll key region where one or more scroll direction keys are displayed for scrolling the information key regions to select the information keys displayed on the information key, inputting an intended key using a pen, and determinating the input key, wherein, if the input key is the information key, a code corresponding to the information key is generated and, if the input key is the scroll key, the information key region is scrolled. Accordingly, the area of the soft keyboard occupying the screen is reduced, to improve the convenience of data input operations.

3 Claims, 6 Drawing Sheets

METHOD FOR INPUTTING INFORMATION USING A SELECTABLE SOFT KEYBOARD

This disclosure is a continuation of patent application Ser. No. 08/470,231, filed Jun. 6, 1995, now abandoned.

BACKGROUND OF THE INVENTION

The present invention relates to a portable information terminal and an information input method using a software keyboard, and more particularly, to a portable information terminal and an information input method where a software keyboard (hereinafter, referred to as a soft keyboard) occupying a small region is displayed and information is input via the displayed soft keyboard.

Recently, with the coming of the information Age, computers have been used to efficiently process and manage large quantities of information. However, a conventional computer system can process the information in a fixed position only, and such fixed-position "passive" processing of information will not sustain future needs.

Accordingly, microcomputers in the form of portable personal information terminals will likely dominate the next generation of information processing. The portable computer for this purpose has to be quite small in size. Therefore, as the input device of such a portable computer, handwriting recognition means for inputting information using a writing instrument (e.g., a ballpoint pen) should be widely used instead of the conventional hardware keyboard. However, using such pen-input recognition means as the input device, the input data cannot be perfectly recognized with current technology; accordingly some kind of soft keyboard is also required as an auxiliary means.

Soft keyboards have been used in many conventional portable information terminals, since the above-described limitations of a pen-input recognition means were appreciated. This soft keyboard is mainly called as an "on-line" keyboard and is established in a display device by software means, for the input of data which cannot be input by pen (handwriting). Here, the data is input by merely pointing with the pen. The arrangement of the soft keyboard is similar to that of a general desktop personal computer (PC). This kind of arrangement provides a customary setting for data input, since anyone familiar with the keyboard arrangement of a PC will find operation easy.

However, there are problems in adopting the soft keyboard having the above keyboard arrangement for a portable personal terminal having a small display device. That is, since the keyboard arrangement of a PC is best-suitable for two-handed input, difficulties arise when inputting information using only one pen, which is presumably performed with one hand. Also, since the arrangement of the conventional soft keyboard coincides with that of the ordinary PC keyboard consisting of a plurality of keyboard rows, the area occupied by the keyboard is great, which is not idea for the display in a computer having a small display screen. To overcome this problem, the soft keyboard may be shifted on the screen; however, this causes a great deal of inconvenience when inputting large amounts of data.

SUMMARY OF THE INVENTION

It is an object of the present invention to provide a portable information terminal adopting a soft keyboard whose screen-occupying area is reduced, to minimize data input inconveniences caused by a large screen-occupying area.

It is another object of the present invention to provide an information input method using the above soft keyboard.

To achieve the above object, there is provided a portable information terminal adopting a soft keyboard, which comprises screen display means for receiving screen data relating to the soft keyboard and displaying the soft keyboard on the display screen, wherein the soft keyboard comprises an information key region where the information keys of a predetermined number are arranged in two lines or less, and a scroll key region where one or more scroll direction keys are displayed for scrolling the information keys to select the information keys displayed on the information key region.

To achieve another object, a method for inputting information using a soft keyboard comprises the steps of: (a) displaying the soft keyboard on a display screen, wherein the soft keyboard comprises an information key region where the information keys of a predetermined number are arranged in two lines or less, and a scroll key region where one or more scroll direction keys are displayed for scrolling the information key regions to select the information keys displayed on the information key; (b) inputting an intended key using a pen; and (c) determinating the input key, wherein, if the input key is the information key, a code corresponding to the information key is generated and, if the input key is the scroll key, the information key region is scrolled.

BRIEF DESCRIPTION OF THE DRAWINGS

The above objects and advantages of the present invention will become more apparent by describing in detail a preferred embodiment thereof with reference to the attached drawings in which.

DETAILED DESCRIPTION OF THE INVENTION

Figure 1:
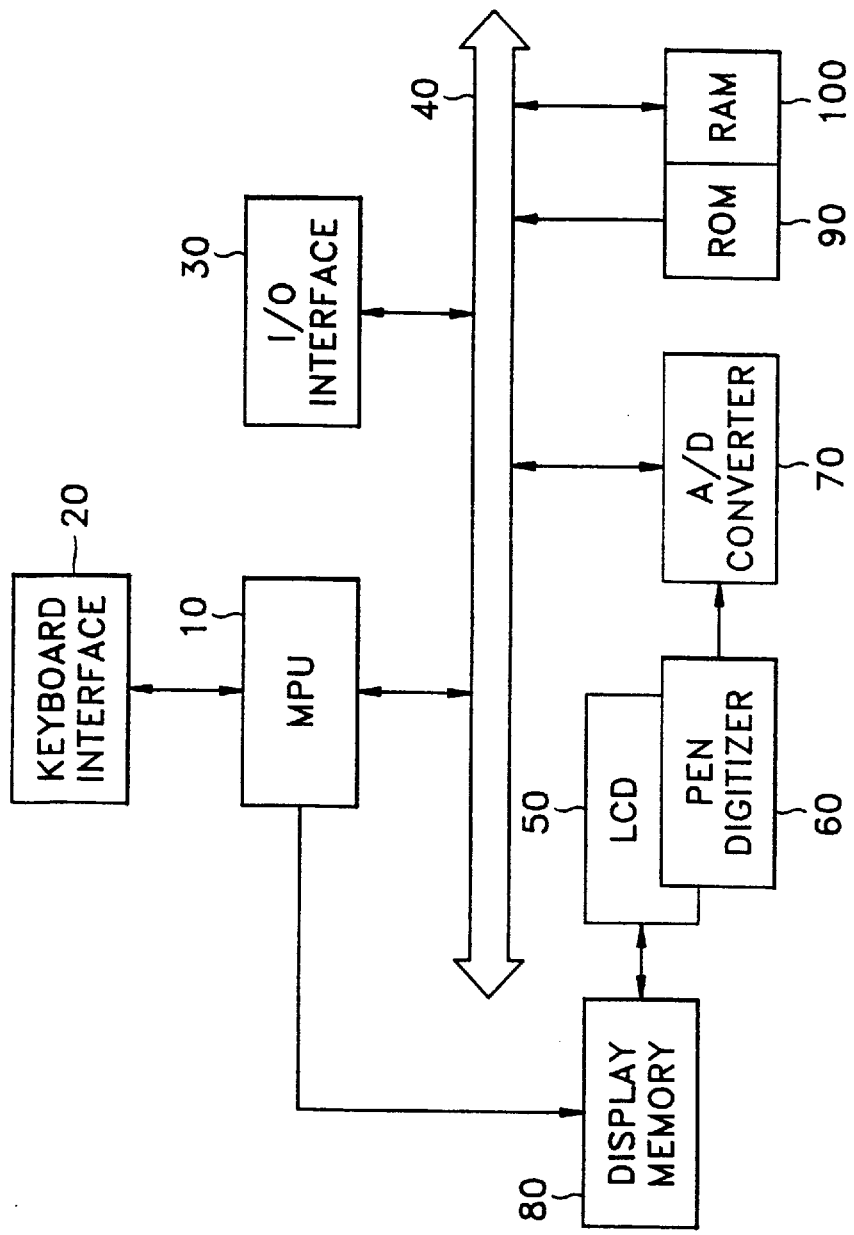
FIG. 1 is a block diagram for illustrating the structure of a portable information terminal adopting a soft keyboard according to the present invention.

A portable information terminal shown in FIG. 1 comprises a microprocessor unit (MPU) 10, a keyboard interface 20, an I/O interface 30, a bus 40, a liquid crystal display (LCD) 50, a pen digitizer 60, an A/D converter 70, a display memory 80, a ROM 90, and a RAM 100.

In the case of connecting a hardware keyboard (not shown), the hardware keyboard is connected to MPU 10 via keyboard interface 20. Pen digitizer 60 recognizes coordinates indicated by the contact of pen input means (not shown). The recognized coordinate location is digitized via A/D converter 70 and is transferred to MPU 10 via bus 40. I/O interface 30 takes charge of the interface of input/output device, and, if necessary, a plurality of I/O interfaces can be installed therein. It is generally preferred that a portable information terminal be small and lightweight for convenient carrying.

The operation of the portable information terminal according to the present invention will be described below.

MPU 10 outputs a soft keyboard screen data to display memory 80 for displaying the soft keyboard on the screen of LCD 50. As a result, the soft keyboard appears on the screen of LCD 50. Here, a user uses a pen to touch a coordinate location on pen digitizer 60 corresponding to an intended key while viewing the soft keyboard on the screen of LCD 50. Then, A/D converter 70 digitizes the contacted coordinate location of pen digitizer 60 and outputs the digitized coordinates to bus 40. MPU 10 receives the coordinates via bus 40 and converts the coordinates into a key code corresponding to the intended key. Therefore, information can be input by a volumeless and weightless soft keyboard instead of the hardware keyboard. Here, in order to reduce the area of the soft keyboard occupying the screen of LCD 50, the soft keyboard comprises an information key region where some of the information keys in a selected keyboard (e.g., alphanumeric keys) are arranged in two rows or less, or two columns or less, a scroll key region where one or more scroll direction keys are displayed for scrolling the keys shown on the screen of LCD 50 in order to bring unshown keys into view, and a keyboard selection key region where keyboard selection keys are displayed for selecting a keyboard among various kinds of keyboards and displaying the selected keyboard on the keyboard information region. Also, the soft keyboard has an end key region used when terminating key input.

Referring to FIGS. 2A–2D, the soft keyboard will be described in detail.

Figure 2A:
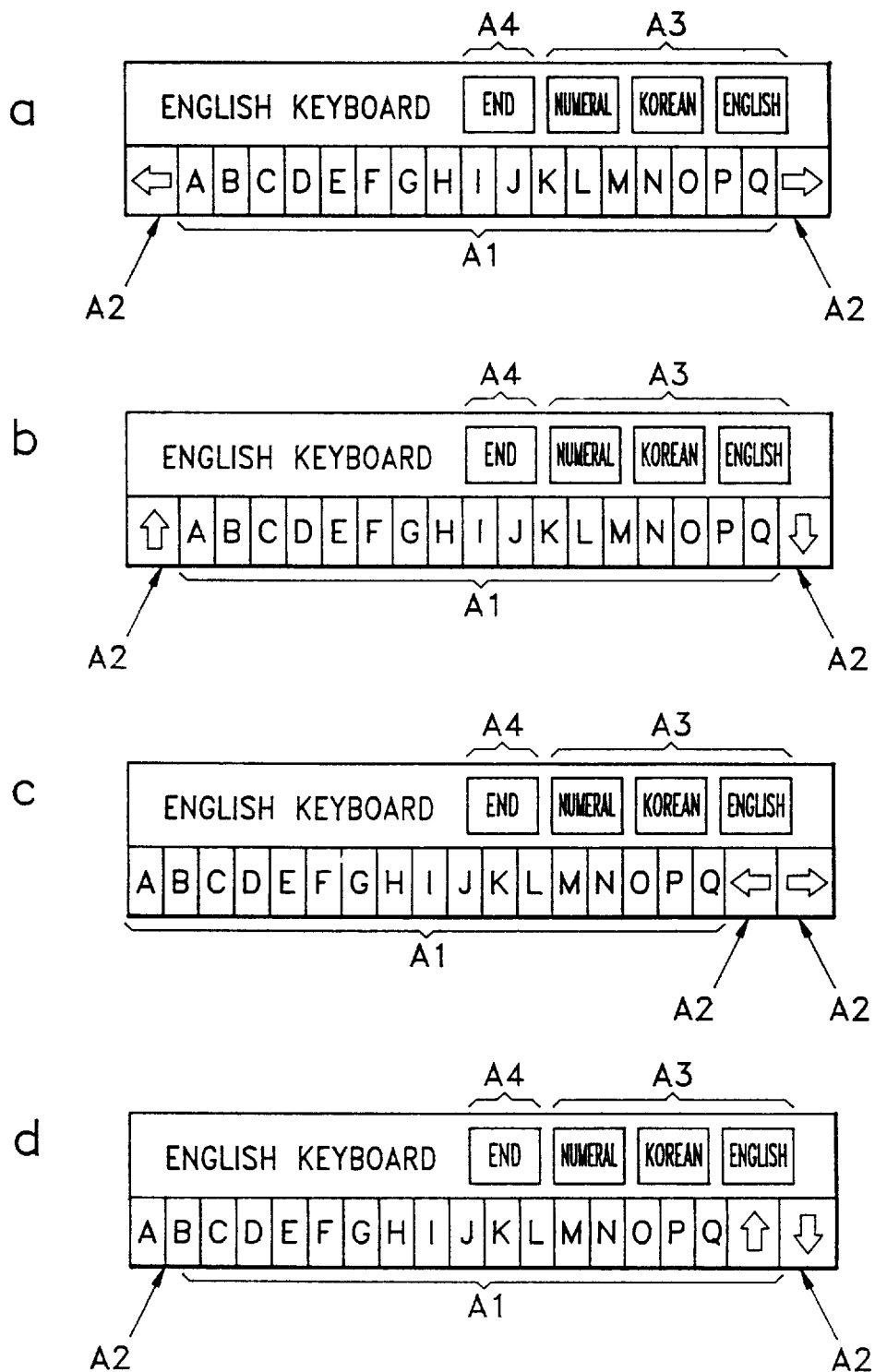
FIGS. 2A–2D are diagrams for illustrating a soft keyboard displayed on the screen of liquid crystal display of FIG. 1.
Figure 2B:
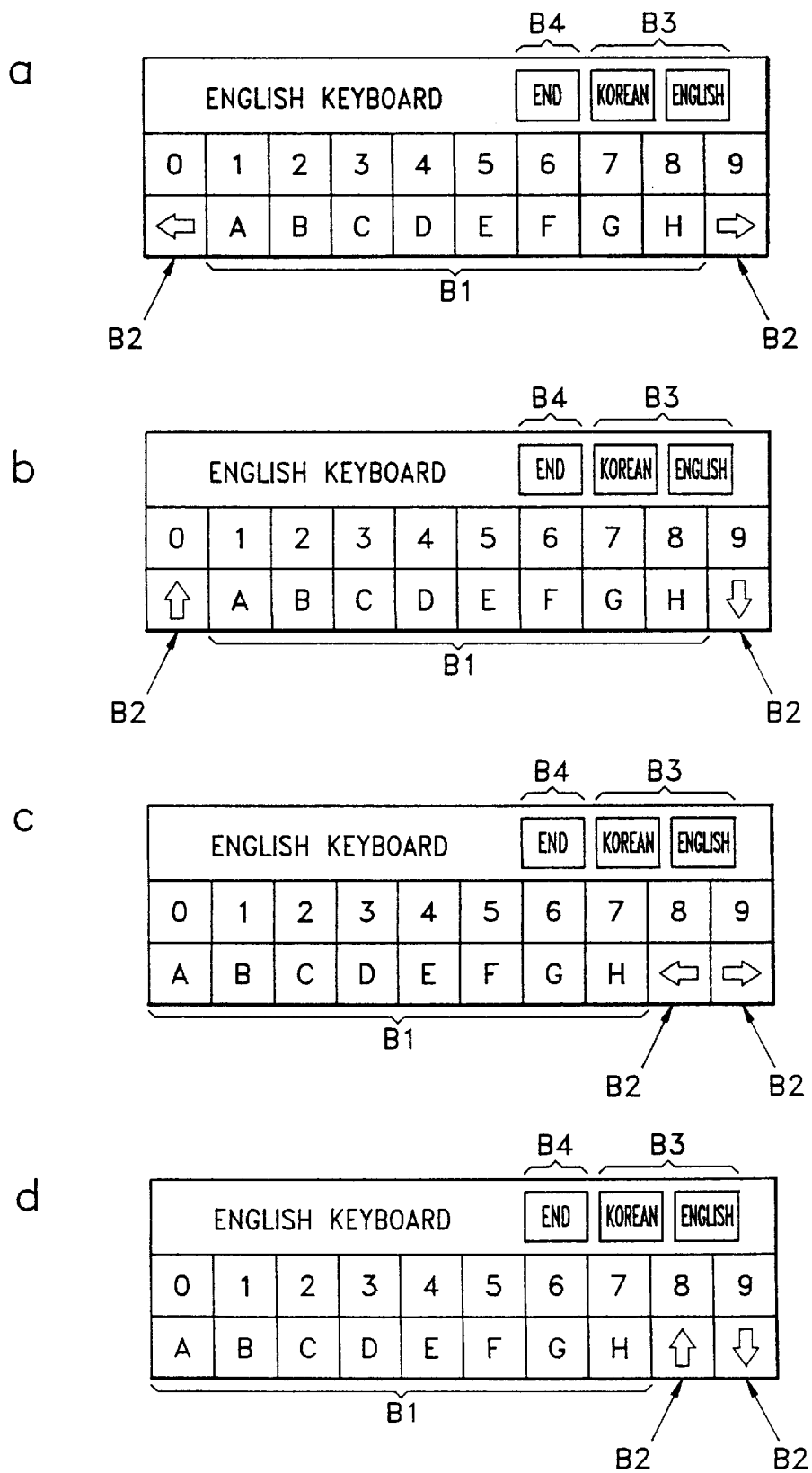
Figure 2C:
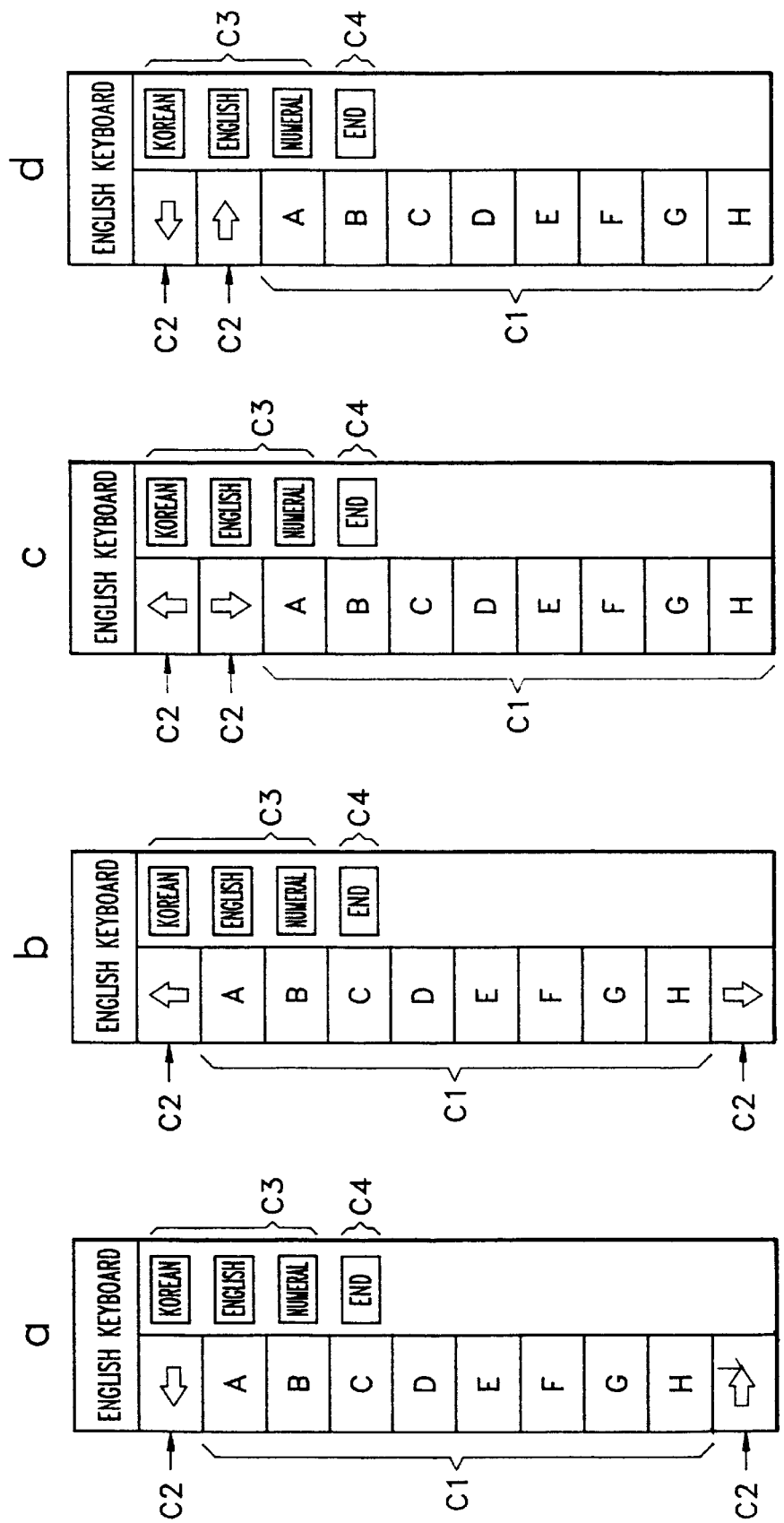
Figure 2D:
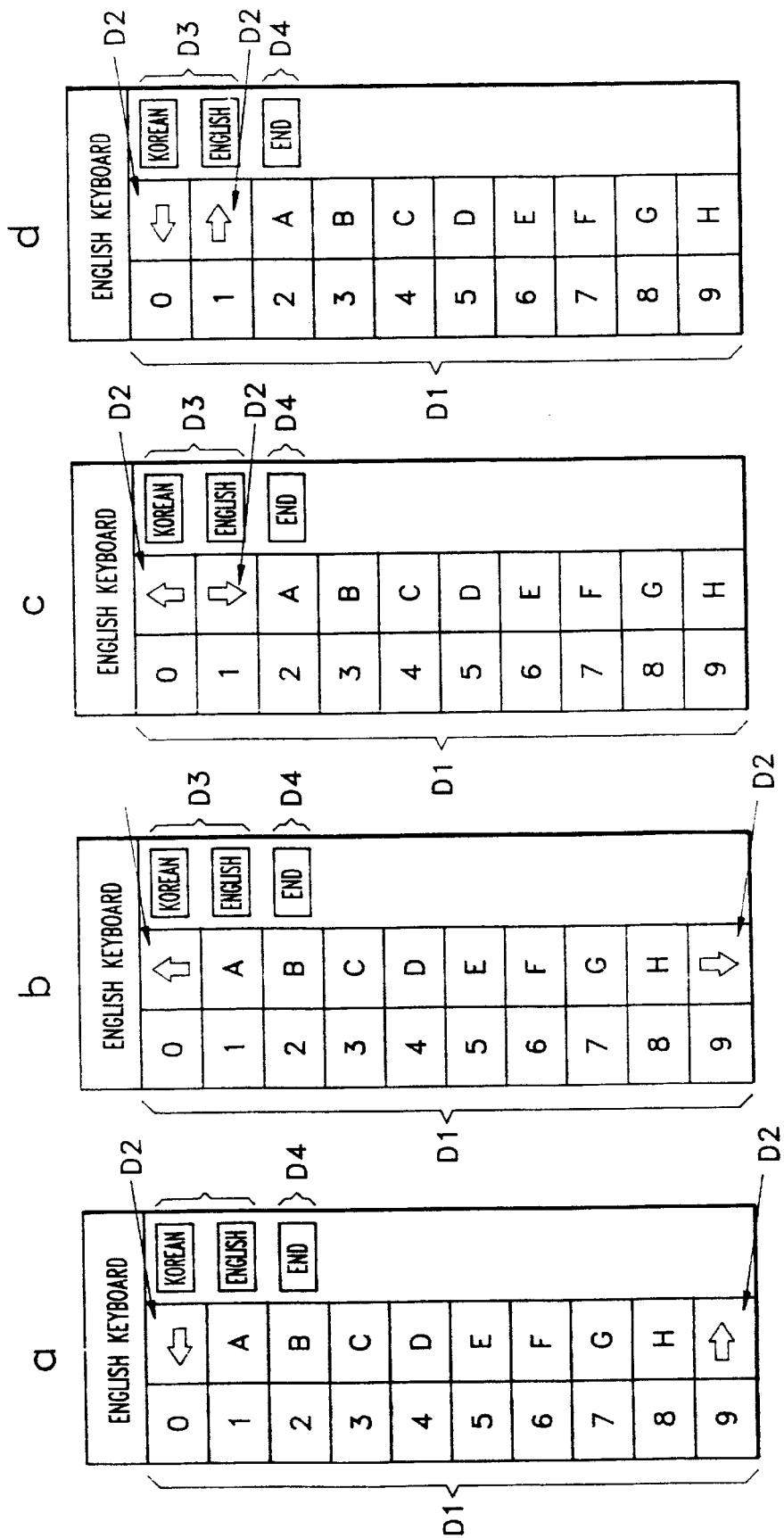

FIGS. 2A–2D are diagrams for illustrating a soft keyboard displayed on the screen of LCD 50 of FIG. 1 according to the present invention. The soft keyboard according to the present invention has a plurality of soft keys. (FIGS. 2A–2D show the case where the keyboard selection key for English-letter input is selected among the keyboard selection keys.) A plurality of soft keys are classified according to function into information key regions A1, B1, C1 and D1 showing some of the information keys, scroll key regions A2, B2, C2 and D2 for horizontally or vertically scrolling the keys, keyboard selection key regions A3, B3, C3 and D3 for selecting an intended keyboard, and end key regions A4, B4, C4 and D4. Here, FIG. 2A shows an information key region A1 composed of one row, FIG. 2B shows an information key region B1 of two rows, FIG. 2C shows an information key region C1 of one column, and FIG. 2D shows an information key region D1 of two columns. As shown in FIGS. 2B and 2D, the arrangement of the frequently used information keys may be fixed, with the other keys being selectively arranged. Additionally, the end keys used when the input of data is terminated are arranged in the end key regions A4, B4, C4 and D4. Also, scroll key regions A2, B2, C2 and D2 may be variably arranged. In FIGS. 2A to 2D, a, b, c and d represent four kinds of arrangement types according to the types (up, down, right and left) and position of the scroll direction keys.

Figure 3:
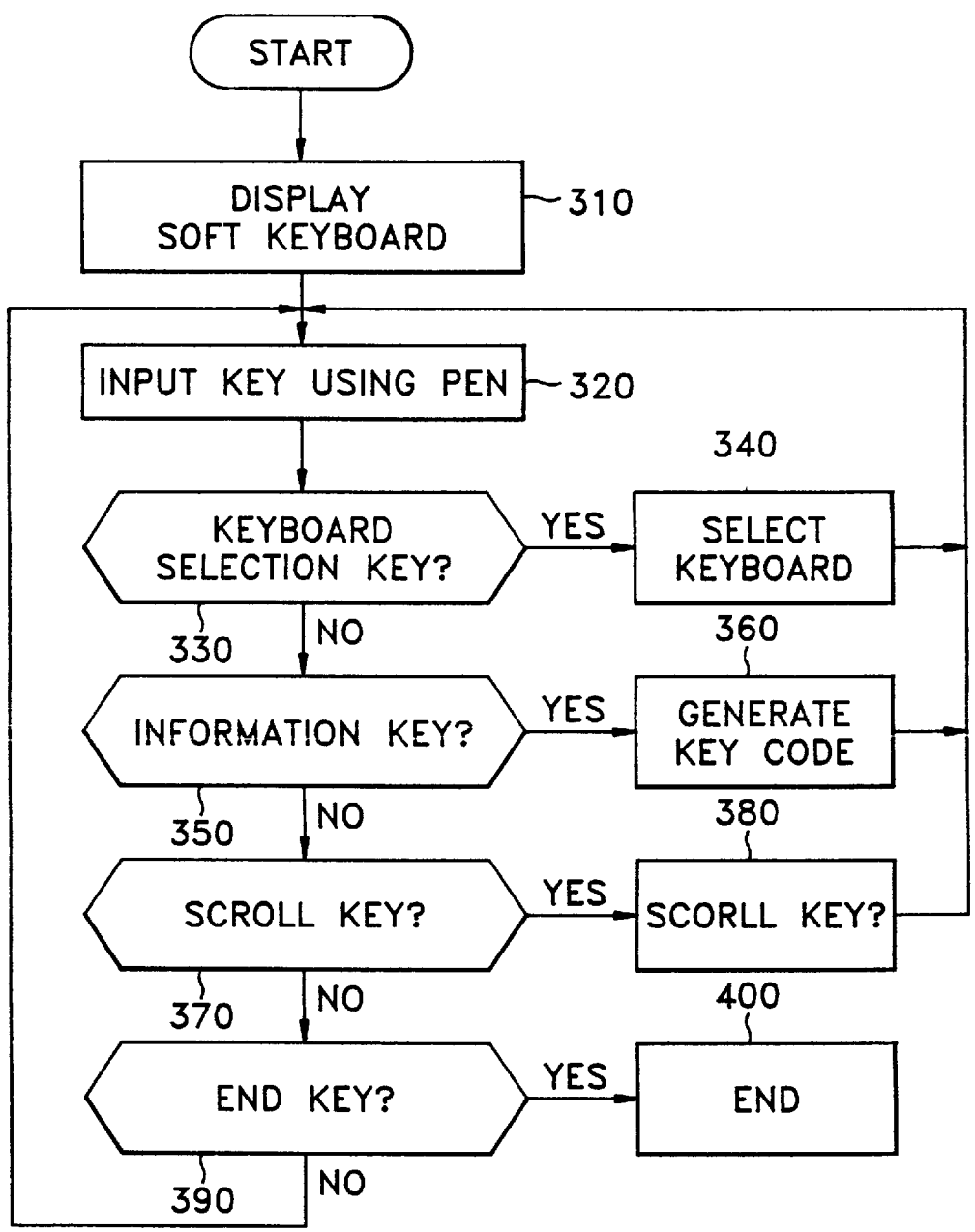
FIG. 3 is a flow chart for illustrating an information input method using a soft keyboard according to the present invention.

FIG. 3 is a flow chart illustrating an information input method using a soft keyboard (as shown in FIGS. 2A–2D) displayed on the screen of LCD 50 in the portable information terminal of FIG. 1.

First, MPU 10 of FIG. 1 outputs screen data of the soft keyboard to display memory 80. Here, the screen data momentarily stored in display memory 80 is output to LCD 50, so that the soft keyboard is displayed on the screen of LCD 50 (step 310). Subsequently, a user selects an intended key while viewing the soft keyboard on the screen of LCD 50, and contacts the corresponding position with a pen to input the intended key (step 320). Here, the pen may be a contact means which can provide pressure according to the input method of pen digitizer 60 or a specific stylus pen. Subsequently, pen digitizer 60 converts the contacted coordinates of the pen into the digital data via A/D converter 70 and transmits the digital data to MPU 10 via bus 40. Here, MPU 10 determines whether the converted digital data is the keyboard selection key of keyboard selection key regions A4, B4, C4 and D4 shown in FIGS. 2A–2D (step 330). In step 330, if the keyboard selection key is input, MPU 10 outputs soft keyboard screen data to display memory 80 for displaying the selected keyboard on the screen of LCD 50, as described above (step 340). If the digital data is not the keyboard selection key in step 330, it is determined whether the converted digital data is the information-key of information key regions A1, B1, C1 and D1 (step 350). If the digital data is the information key in step 350, a code corresponding to the key is generated (step 360). That is, the key input is received as the same state as the corresponding key of the hardware keyboard is pushed. Meanwhile, if the digital data is not the information key in step 350, it is determined whether the converted digital data is the scroll key of scroll key regions A2, B2, C2 and D2 (step 370). If the digital data is the scroll key in step 370, the information key regions are scrolled (step 380). Here, information key regions A1, B1, C1 and D1 are horizontally or vertically scrolled according to the arrangement of the soft keyboard shown in FIGS. 2A–2D. Meanwhile, if the digital data is not the scroll key in step 370, it is determined whether the digital data is the end key (step 390). Here, if the digital data is the end key, the input of information is terminated (step 400), but if not, step 320 and steps 340, 360 or 380 are iterated.

As described above, the portable information terminal according to the present invention receives information by contacting the position of a corresponding soft keyboard with a pen when part of the keys are displayed on the screen of the LCD or the corresponding information keys are displayed on the screen using a horizontal or vertical scroll key, if necessary. Therefore, the area of screen occupied by the soft keyboard is minimized so that the inconvenience generated during inputting of data is reduced.

What is claimed is:

1. A method for inputting information using a soft keyboard comprising:
    (a) displaying a soft keyboard including an information key region having a plurality of information keys arranged in, at most, two rows or two columns for inputting information, a scroll key region having at least one scroll direction key for scrolling the information keys, a keyboard selection key region having keyboard selection keys for selecting and shifting between keyboards having the information keys arranged in up to two rows or up to two columns, and an end key region having an end key for terminating information input through the information keys;
    (b) selecting one from the information keys, scroll direction key, keyboard selection keys, and end keys using a pen; and
    (c) determining the key selected, and, if the key selected is an information key, generating a code corresponding to the information key, if the key selected is the scroll key, scrolling the information key region, if the key selected is a keyboard selection key, displaying a keyboard having the information keys in up to two rows or up to two columns according to the keyboard selection key selected, and, if the key selected is the end key, terminating operation of the soft keyboard.

2. The method of claim 1 wherein the keyboard selection key region includes keyboard selection keys for selecting keyboards in different languages.

3. The method of claim 1 wherein the keyboard selection key region includes keyboard selection keys for selecting between alphanumeric and alphabetic keyboards.

* * * * *